US011333221B2

(12) United States Patent
Beaudet

(10) Patent No.: US 11,333,221 B2
(45) Date of Patent: May 17, 2022

(54) GEAR SET IN WHICH INTERACTING GEARS HAVE A DIFFERENT CIRCULAR PITCH

(71) Applicant: Donald C. Beaudet, Smoothrock Falls (CA)

(72) Inventor: Donald C. Beaudet, Smoothrock Falls (CA)

( * ) Notice: Subject to any disclaimer, the term of this patent is extended or adjusted under 35 U.S.C. 154(b) by 137 days.

(21) Appl. No.: 16/825,387

(22) Filed: Mar. 20, 2020

(65) Prior Publication Data

US 2020/0300339 A1 Sep. 24, 2020

Related U.S. Application Data

(60) Provisional application No. 62/822,461, filed on Mar. 22, 2019.

(51) Int. Cl.
*F16H 1/20* (2006.01)
*F16H 1/24* (2006.01)
*F16H 55/17* (2006.01)
*F16H 55/10* (2006.01)

(52) U.S. Cl.
CPC ............. *F16H 1/203* (2013.01); *F16H 1/24* (2013.01); *F16H 55/10* (2013.01); *F16H 55/17* (2013.01); *F16H 2055/173* (2013.01)

(58) Field of Classification Search
CPC . F16H 1/203; F16H 1/24; F16H 55/10; F16H 55/17; F16H 2055/173
See application file for complete search history.

(56) References Cited

U.S. PATENT DOCUMENTS

| 616,381 | A | * | 12/1898 | White | F16H 55/10 74/415 |
|---|---|---|---|---|---|
| 1,289,508 | A | * | 12/1918 | Melcher | F16H 55/10 74/465 |
| 2,935,885 | A | * | 5/1960 | Saari | F16H 1/203 74/425 |
| 6,183,388 | B1 | * | 2/2001 | Hawkins | F16H 1/22 475/336 |
| 2013/0031996 | A1 | * | 2/2013 | Imase | F16H 55/10 74/465 |
| 2017/0314664 | A1 | | 11/2017 | Hesse | |
| 2020/0408279 | A1 | * | 12/2020 | Katayama | F16H 1/12 |

FOREIGN PATENT DOCUMENTS

WO     WO2016179682     11/2016

* cited by examiner

*Primary Examiner* — Terence Boes
(74) *Attorney, Agent, or Firm* — Jacobson Holman PLLC

(57) ABSTRACT

The present application provides a mechanical gearbox, comprising a wheel oriented vertically; a first set of teeth on a first face of the wheel defining a first gear; a second set of teeth on a second face of the wheel defining a second gear; an input gear operably engaged with the first set of teeth on the first gear; an output gear operably engaged with the second set of teeth on the second gear; wherein the input gear and the first gear have different circular pitches, and/or the second gear and the output gear have different circular pitches.

20 Claims, 9 Drawing Sheets

GEAR SET IN WHICH INTERACTING GEARS HAVE A DIFFERENT CIRCULAR PITCH

FIELD OF THE INVENTION

The invention relates to a gear set, and more particularly, to a gear set comprising a compound gear train that increases or decreases speed and/or torque from an input source to an output, and in which the gears in at least one gear set have different circular pitches.

BACKGROUND OF THE INVENTION

Gear sets are a component of many mechanical elements, which can often be associated with additional electrical and hydraulic devices. Fundamentally, gear sets typically comprise an input shaft, a plurality of gear or series of gears combined in such a manner to increase or decrease torque/speed, and an output shaft.

Although output speed reduction is one of the more common modern usages of a gear set, increasing output speed is also desirable in some applications such as in many turbines. It is also possible to realize a change in shaft angle through the use of a gear set.

Gear sets are designed to not just increase or decrease torque/speed, but to place the torque/speed at the ideal level for utilization by an end device. To accomplish this, there are many types of gear sets, which comprise different types of gears, such as e.g. spur gears, worm gears, bevel gears, and planetary gears, to name a few. The type used for a given application often depends on the desired use of the gearbox, as well as other factors such as cost, size, etc.

Gear sets facilitate many processes, and are therefore useful throughout industry. Some examples of uses of gear sets include running conveyor belts, windmills, turbines, medical machines, food processors, printing devices, computers, automotive engines, and construction-related machinery.

The inherent usefulness of gear sets implores further design in an attempt to increase durability, efficiency, and cost-effectiveness.

Such designs include International Application Number PCT/CA2016/000077, which discloses a gearbox comprising a vertically oriented wheel. Each face of the wheel has teeth that define a first gear and a second gear. An input gear engages the teeth of the first gear at a position of about 0° to 90° above the horizontal.

Also, United States Patent Publication No. US 2017/0314664 discloses a gearing pairing, in which the first gear is manufactured from a material that is less elastic or soft in comparison to the second gear, and the first gear and second gear have different normal target base pitches.

SUMMARY OF THE INVENTION

According to an aspect of the present invention, there is provided a mechanical gearbox, comprising a wheel oriented vertically; a first set of teeth on a first face of the wheel defining a first gear; a second set of teeth on a second face of the wheel defining a second gear; an input gear operably engaged with the first set of teeth on the first gear; an output gear operably engaged with the second set of teeth on the second gear; wherein the input gear and the first gear have different circular pitches, and/or the second gear and the output gear have different circular pitches.

BRIEF DESCRIPTION OF THE DRAWINGS

The present invention will now be described in more detail having regard to the drawings in which.

DETAILED DESCRIPTION OF THE INVENTION

A better understanding of the present invention and its objects and advantages will become apparent to those skilled in this art from the following detailed description, wherein there is described only the preferred embodiments of the invention, simply by way of illustration of the best mode(s) contemplated for carrying out the invention. As will be realized, the invention is capable of modifications in various obvious respects, all without departing from the scope and spirit of the invention. Accordingly, the description should be regarded as illustrative in nature and not as restrictive.

FIGS. 1 to 4 illustrate an exemplary mechanical gear set 10 according to an embodiment of the present invention. The gear set 10 comprises a wheel 12 or disk. The wheel 12 may be of any size, and the size is largely dependent upon how and where the gear set 10 will be used. For larger embodiments, it is preferred that the wheel 12 be at least approximately 38.5 inches in diameter.

In this embodiment, the wheel 12 is oriented in an upright and vertical position as can be seen throughout FIGS. 1 to 4. The wheel 12 is supported by an axle 20 substantially at its center. The axle 20 is then preferably supported by vertical supports (not shown) that extend down to the ground. Alternatively, the axle 20 extends outward from the center of the wheel 12 and is secured e.g. by nearby vertical walls such as by means of bearings and housings, or the inner walls of e.g. a gearbox as shown generally in FIGS. 8 and 9. When the axle is supported, the wheel 12 is able to rotate freely.

The material of the wheel 12 is also not particularly limiting, but preferably it is made of a metal, such as steel or aluminum, metal alloy, or a composite material that is able to withstand rigorous activity.

Figure 1:
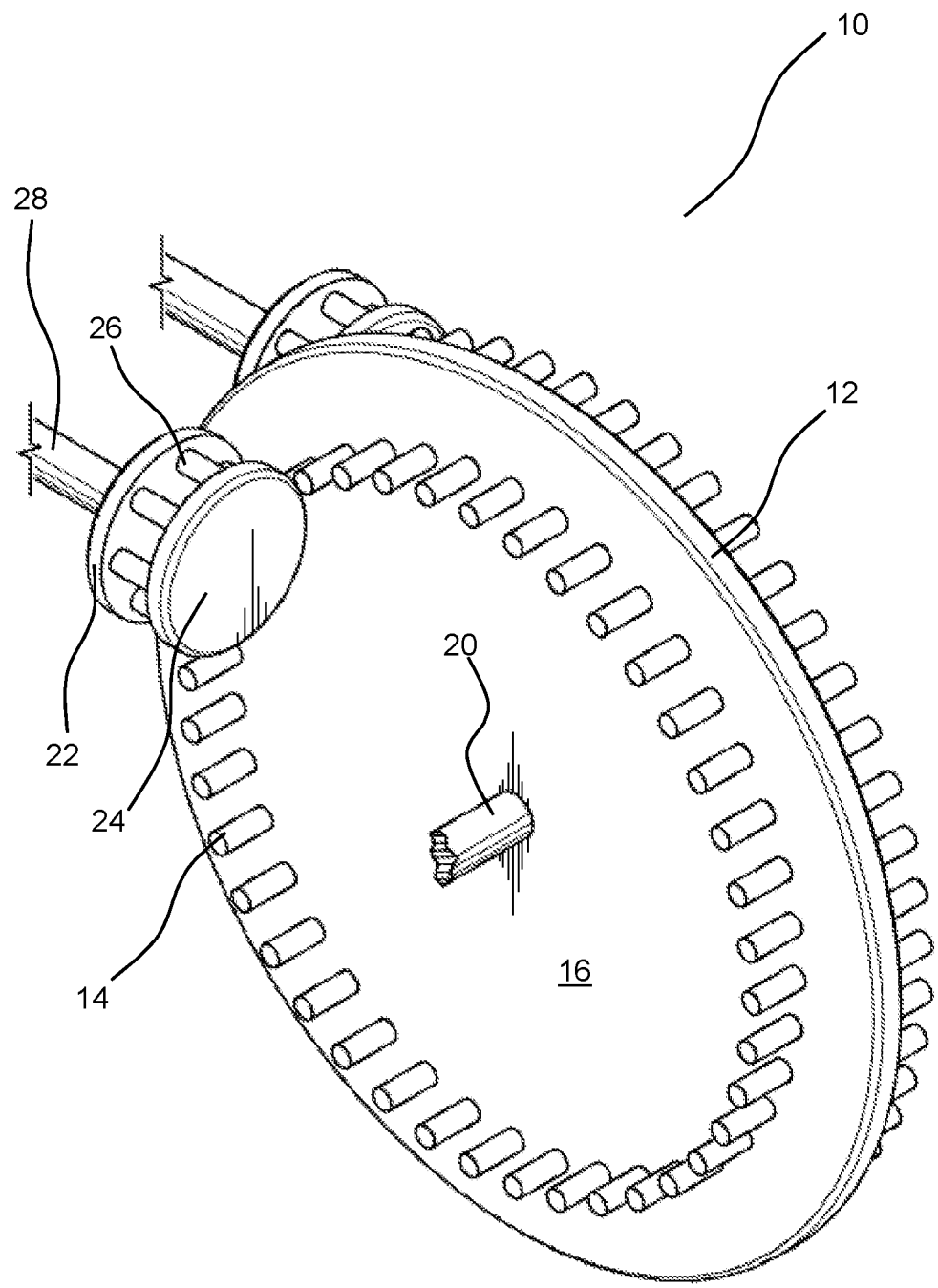
FIG. 1 is a left side perspective view showing a gear set of an embodiment of the present invention.

In the exemplary embodiment shown in FIG. 1, on a first face of the wheel 12, teeth 14 extend outward from the wheel 12 in a lateral direction. The circumference of the circular pattern of the teeth 14 forms a first gear 16.

Figure 2:
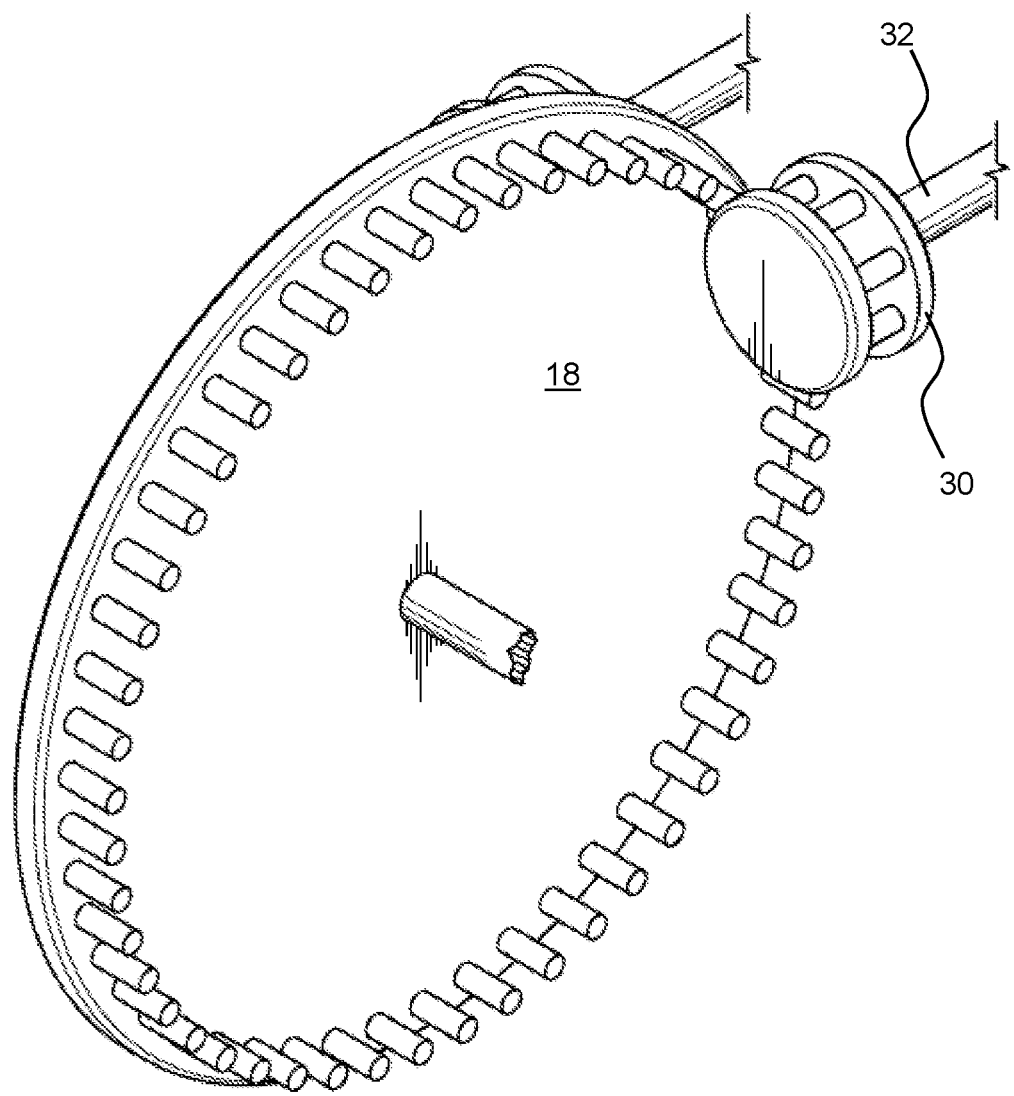
FIG. 2 is a right side perspective view showing a gear set of an embodiment the present invention.

FIG. 2 illustrates the second face of the wheel 12, in which a second set of teeth 14 extend outward from the wheel 12 in a lateral direction. The circumference of the circular pattern formed by the teeth 14 on the second face of the wheel 12 form the second gear 18.

Preferably the diameter of the first gear 16 is smaller than the diameter of the second gear 18. The ratio of the diameter of the first gear 16 to the second gear 18 is not particularly limiting, and can be adjusted based upon the desired gear ratio. Preferably, the ratio of the diameter of the first gear to the second gear is in the range of 0.75:1 to 0.99:1.

In the embodiment illustrated in the FIGS. 1 to 4, the teeth 14 of the first and second gears may be produced by drilling holes through the wheel 12 and inserting rods or bolts etc. of a predetermined length through the holes. The teeth 14 protrude away from the wheel 12 sufficient distances to allow for engagement with an input 22 and/or output 30 gear. Alternatively, the teeth 14 can be produced by affixing rods or bolts etc. to the wheel 12 through a known process, such as welding.

The wheel 12 is shown as a unitary piece that has rods extending outward to form teeth 14 that thereby define the first 16 and second gears 18 of the mechanical gearbox 10. However, other design embodiment of the gears are contemplated including known designs of compound gears that would be well understood to the person of skill in the art.

According to a further embodiment, the wheel 12 does not need to be unitary in nature. Rather, two distinct wheels, in which one defines a first gear 16 and the other defines a second gear 18 may be joined together to form the wheel 12.

In one embodiment, motive power is provided to the first gear 16 by engagement with an input gear 22. The interaction of the first gear and the input gear forms the first gear set. In a preferred embodiment, the input gear 22, as illustrated in FIGS. 1 to 4, is a cage gear. The input gear 22 comprises two opposing circular end pieces 24 that are joined together by a series or rods 26. The rods 26 attach near the circumference of the end pieces 24, and act as de facto teeth.

The number of rods 26/teeth of the input gear 22 may vary, and is typically determined based upon the size and/or desired circular pitch of the input gear 22.

An input shaft 28 from an input source such as e.g. a rotor, provides rotational power and drives the rotation of the input gear 22 by e.g. connecting with the center of the input gear 22 to form an axle. When engaged, the teeth 14 of the first gear 16 mesh with the input gear 22 through insertion of the teeth 14 into the gaps between the rods 26. When the input gear 22 rotates, the rods 26 apply a force to the teeth 14 of the first gear 16 causing the wheel 12 to turn about its axle 20.

As can be seen in FIG. 2, the second gear 18 engages with an output gear 30 to form a second gear set.

The output gear 30 illustrated in FIGS. 1 to 4 is a cage gear, but may be another known gear style. Similar to the input gear 22, the output gear comprises two opposing circular end pieces 24 that are joined together by a series or rods 26. The rods 26 attach near the circumference of the end pieces 24, and act as de facto teeth. The number of rods 26/teeth of the output gear 30 may vary, and is typically determined based upon the size and/or desired circular pitch of the output gear 30. When engaged, the teeth 14 of the second gear 18 mesh with the output gear 30 through insertion of the teeth 14 into the voids between the rods 26. As the wheel 12 rotates, such as in response to an input of motive power by the input gear 22, the teeth 14 apply a force to the rods 26 of the output gear 30, thereby causing the output gear 30 to rotate. An output shaft 32 forms the axle for the output gear 30 and rotates freely to transmit rotational power to the ultimate output device, such as e.g. a generator.

The diameter of the input 22 and output 30 gears may vary particularly as the diameter of the wheel 12 is increased or decreased. Although in one embodiment, the output gear 30 has a larger diameter than the input gear 22.

It is preferable that the input gear 22 has a smaller circular pitch than the output gear 30 when two gear sets are coupled and arranged in the gearbox. The pitch between both gears can vary within a range from 1:1.05 to 1:1.3, with the output gear 30 having the large circular pitch. The diameter of each gear may vary according to the number of teeth and its circular pitch.

FIGS. 1 to 4 illustrate a preferred embodiment of the invention, in which the input and output gears 22, 30 can be seen engaging the first and second gears 16, 18. Gears of a gear set typically engage tangentially, however in this embodiment, the input and output gears 22, 30 are offset in their engagement with the first and second gears 16, 18.

Figure 3:
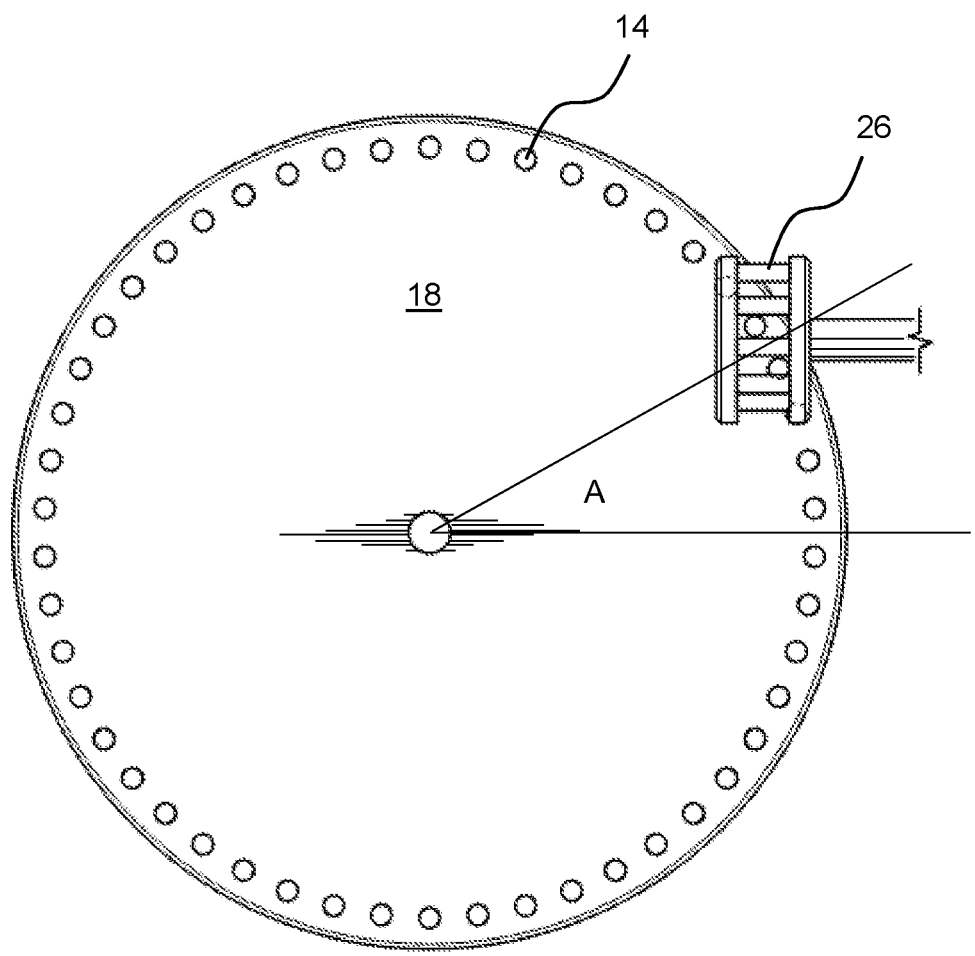
FIG. 3 is a right side view of the gear set of the present invention as shown in FIG. 2.

In this embodiment, the input and output gears 22, 30 are oriented substantially vertically when engaging with the first and second gears 16, 18, respectively. As can be seen in FIGS. 2 and 3, the rods 26 and the axle 28 of the output gear 30 are substantially parallel to the horizontal diameter of the second gear 18. FIG. 3 illustrates that the output gear 30 is engaging with the first gear 18 at about 30° above the horizontal diameter of the first gear as measured by the angle A, i.e. at about the two o'clock position when viewing the front face of the wheel 12. The input shaft 32 is substantially horizontal causing the output gear 30 itself to be oriented in a substantially vertical position. A similar engagement of the input gear 30 with the first gear 16 can be seen in FIG. 1.

In order for the teeth 26 of the input gear 22 and the teeth 14 of the first gear 16 to properly mesh during use according to this embodiment, the gears do not share the same circular pitch as is typically required of a standard gear set.

Similarly, according to one embodiment, the meshing second gear 18 and output gear 30 also do not have the same circular pitch. Rather, the circular pitch of the gears, or the distance between corresponding points of consecutive gear teeth measured along the pitch circle of the input gear 22, is calculated based on the position at which the input/output gear 22, 30 will engage with the first/second gear 16, 18. The ratio of the circular pitch between the input gear 22 and the first gear, and the output gear 30 and the second gear 118 can vary, e.g. within a range from 1:1.05 to 1:1.3, with the first or second gear having the larger circular pitch.

Figure 4:
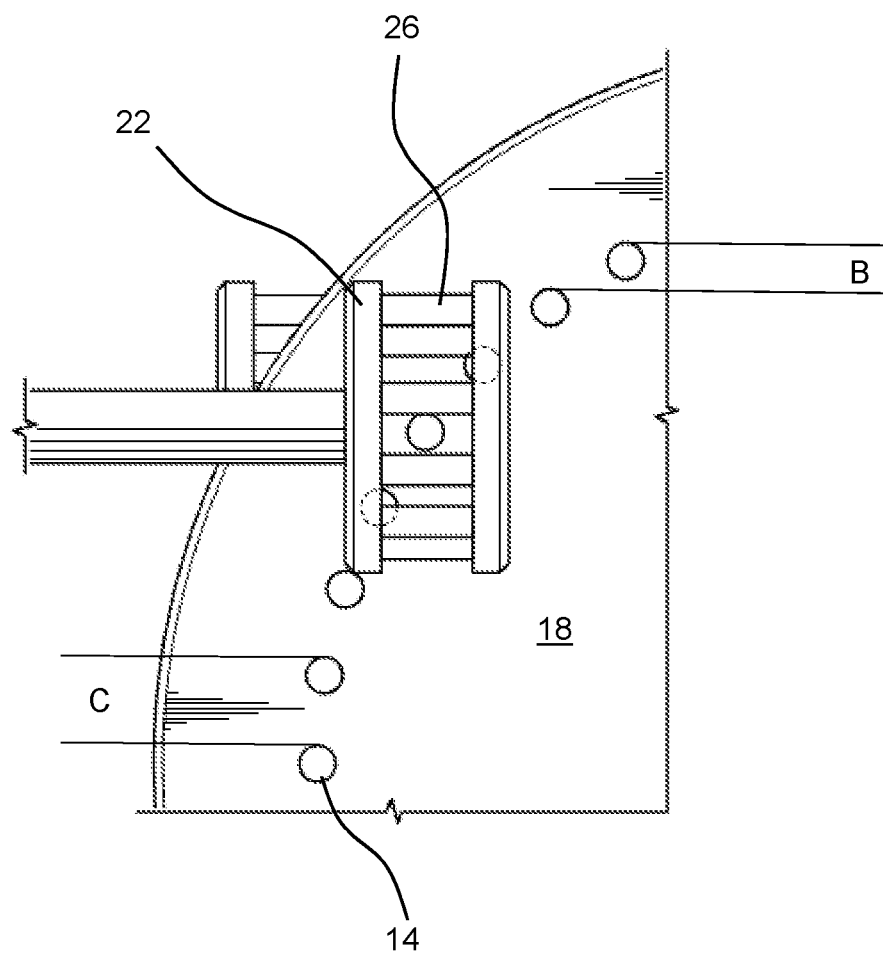
FIG. 4 is an enlarged fragmentary view of the left side of the gear set as shown in FIG. 1.

In one embodiment, the first gear 16 will be designed and fabricated before the input gear 22, and it will therefore have a constant circular pitch. The circular pitch of the input gear 22 will not be equivalent to that of the first gear 16. The circular pitch of the input gear 22 will be based on the vertical pitch of the first gear 16 at about the point that the input gear 22 will interact with the first gear 16. The effective pitch or vertical pitch of the first gear 16 is the vertical distance between corresponding points on adjacent teeth 14, and is calculated specifically based on what position of the first gear 16 is inspected. In FIG. 4, the variance in vertical pitch is shown. For example, the vertical distance or vertical pitch C between corresponding points of consecutive gear teeth 14 at the lower position of the first gear 16 as shown in FIG. 4 is larger than the vertical distance or vertical pitch B between corresponding points of consecutive gear teeth 14 at the upper position of the first gear 16.

An input gear 22 having the same circular pitch and having this illustrated offset vertical alignment would not be able to functionally mesh with the first gear 16 at the position illustrated in any of FIGS. 1 to 4. In order for the input gear 22 to functionally mesh with the first gear 16, the circular pitch of the input gear 22 is about the same as the vertical pitch of the first gear 16 when the vertical pitch is measured at about the point at which the input gear 22 will engage with the first gear 16. For example, if the input gear 22 was designed and fabricated to engage with the first gear 16 at the lower position as can be seen on FIG. 4, the input gear 22 would have a circular pitch about equal to the vertical pitch C. Similarly, if the input gear 22 was designed and fabricated to engage with the first gear 16 at the upper position as can be seen on FIG. 4, the input gear 22 would have a circular pitch equal to the vertical pitch B.

As will be appreciated, as the circular pitch of the input gear 22 decreases, such as at position B, the thickness of the teeth on the input gear 22 may need to be commensurately decreased in order to ensure meshing with the first gear 16.

When designing and/or fabricating the input gears 22, the circular pitch can be varied in a number of ways. This can be done by varying the number of rods/teeth 26 and/or by altering the diameter of the input gear 16.

According to an embodiment of the present invention, there is a preferred operating range at which the input gear 22 should engage with the first gear 16.

For example, with the input gear 22 in this offset vertical orientation, engagement with the first gear 16 at either of its diametrical vertical positions, i.e. the 6 o'clock or 12 o'clock positions when viewing the front face of the first gear 16, proper meshing could not occur and the input gear 22 would be unable to provide motive power to the first gear 16. If the input gear 22 engages with the first gear 16 at either of its diametrical horizontal positions, i.e. the 3 o'clock or 9 o'clock positions when viewing the front face of the first gear 16, this would result in a typical tangential engagement with the first gear 16, and the input gear 22 would have a circular pitch equal to that of the first gear 16. Accordingly, in one embodiment of the present invention, the input gear 22 may engage with the first gear 16 at a range of from 1 degree to 85 degrees above or below the diametrical horizontal plane of the first gear 16.

In one embodiment, the input gear 22 engages with the first gear 16 in the offset manner discussed above and as shown in FIG. 4, and the output gear 30 engages with the second gear 18 in a standard tangential way, i.e. the output gear 30 is designed and fabricated with the same circular pitch as the second gear 18, and tangentially engages with the second gear 18. Similarly, in one embodiment, the output gear 30 engages with the second gear 18 in the manner discussed above and as shown in FIG. 3, and the input gear 22 engages with the first gear 16 in a standard way, i.e. the input gear 22 is designed and fabricated with the same circular pitch as the first gear 16, and tangentially engages with the first gear 16. In an alternative embodiment, both the input and output gears 22, 30 engage the first and second gears 16, 18, respectively, in the manner discussed above and as shown in FIGS. 1 to 4.

One benefit of having the input gear 22 and output gear 30 engage the wheel 12 in a substantially vertical manner as illustrated in FIGS. 1 to 4, is it allows the plane of the wheel 12 to be generally parallel to the length of the input and output shafts 28, 32. Such a design makes the gear sets fairly linear, which can minimize the space required when integrating the gear sets into a gearbox, or into a larger system.

The point at which the input and output gears 22, 30 engage with the first and second gears 16, 18, respectively, directly impacts the circular pitch of the teeth of the input and output gears 22, 30.

The input 22 and output 30 gears may engage the first 16 and second 18 gears of the wheel 12, respectively, at any point along the circumference of the gears.

However, as can be seen in the exemplary embodiments shown in the Figures, it is preferred that the input gear 22, 122 and/or output gear 30, 130 engage the teeth 14, 115 of the first gear 16, 116 and/or the teeth 114 of the second gear 18, 118 at a point A (see FIG. 3) of from about 1° to about 85° above or below the horizontal diameter of the wheel 12, 112. It has been found that such an engagement angle of the input and output gears 22, 122, 30, 130 with the first and second gears 16, 116, 18, 118 provides for efficient transfer of rotational power.

In a preferred embodiment, the input gear 22 and/or output gear 30 engage the first gear 16 at a point A from about 45° to about 60° above the horizontal axis of the wheel 12, and an even more preferred embodiment is between 50° and 56° above the horizontal axis of the wheel 12.

According to one embodiment, a meshing tooth 26 of the output gear 30 is engaged with a tooth from the second gear starting from a point located below the horizontal diameter of the output gear 30 and ends at a point located above the horizontal diameter of the output gear 30, as seen in FIG. 4. In other words, the operating angle (engaging points) of the output gear 30 occur evenly below and above the horizontal diameter of the gear.

For example, please see FIG. 3, in which the second gear 18 is the drive gear and rotates in a counter clockwise direction. The tooth 14 of the second gear 18 starts to engage a tooth 26 of the output gear 30 at a point located below the horizontal diameter of the output gear 30, and the tooth 14 ends the engagement with the tooth 26 at a point located above the horizontal diameter of the output gear 30.

In the embodiment shown in FIGS. 1 to 4 embodiment, only the output gear 30 operates in this manner, from the perspective of the second gear 18, engagement with the output gear 18 occurs above or below the horizontal diameter of the wheel (from 1 to 85 degrees).

When engagement of a tooth 26 of the output gear 30 occurs evenly above and below the horizontal diameter of the output gear 30, its circular pitch is equal to its vertical pitch. This also applies to the engagement of a tooth of the input gear 22 and the first gear 16. The first/second gears 16, 18 are basing their circular pitch on the vertical pitch as a means to transfer power.

In another embodiment, the teeth 115 of the first gear 116 or the teeth 114 of the second gear 118 may extend outwardly in a radial direction, to form a type of spur gear (see FIGS. 5 to 8). Teeth 114 extending radially from the circumference of the wheel 112 would form the second gear 118, whereas another set of teeth 115 would be attached to or molded with the first face of the wheel 112, effectively pointing radially outward, but defining a smaller circumference that would define the first gear 116 (See e.g. FIG. 6). Alternatively, a hybrid type wheel 112 is contemplated, such as that shown in FIG. 5, in which the teeth 115 of the first gear 116 are bars or rods that extend outwardly from the face of the wheel 112, similar to those illustrated in the embodiments shown in FIGS. 1 to 4.

According to a further embodiment, the teeth 114 extending radially from the wheel 112 preferably have a modified shape or profile. As can be seen in FIGS. 5 to 8, the shape of the teeth 114 of the second gear 118 is not symmetrical in design. In one embodiment, such as that shown in FIG. 7, the shape of the teeth 114 of the second gear 118 reflects a portion of a circular segment, or a portion of a semicircle. Preferably, the first face 140 of the tooth is arcuate, and the second face 142 of the tooth 114 is substantially flat or linear. It is the first face 140 of the teeth 114 that engages with and transfers force to the teeth of the output gear 130. See for example FIG. 7, in which the large wheel would be rotating in a counter clockwise direction, and it is the arcuate first face 140 of the teeth 114 of the second gear that is applying force to the teeth 126 oft the output gear 130.

Figure 7:
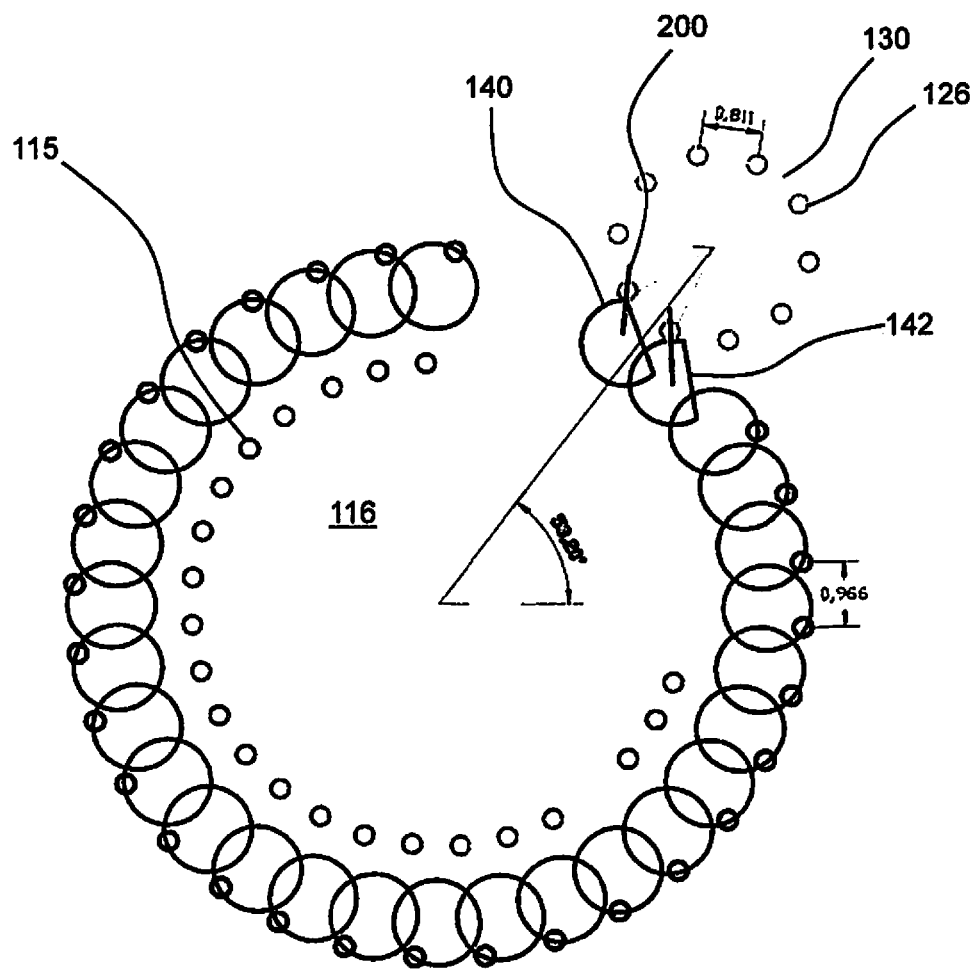
FIG. 7 is a front view of a gear set according to yet another embodiment of the present invention.

FIG. 7 is intended to show the underlying basis of how the teeth 114 of the second gear 118 may be designed according to one embodiment. FIG. 7 illustrates only two fully formed teeth 114, in which a segment of a circle has been removed. The removed portion of the circle defines the substantially flat second face 142 of the tooth 114, while the remaining circular portion of the circle defines the arcuate first face 140 of the tooth 114 according to this embodiment. The remainder of the teeth 114 are shown as whole circles before the segment has been removed to form the teeth 114. Other shapes are contemplated, such as those shown in FIGS. 5, 6, and 8, in which the arcuate nature of the first face is not as pronounced. These teeth 114 have more of a sawtooth wave configuration, while incorporating an arcuate first face 140. The arcuate nature of the first face 140 can be altered by changing the size or the underlying circle that ultimately forms the teeth 114.

In this embodiment, one or both sets of meshing gears, i.e. the input gear 122 with the first gear 116 and/or the second gear 118 with the output gear 130, have different circular pitches. For example, in FIG. 7, the circular pitch of the second gear 118 is larger than the circular pitch of the output gear 130. The modified shape of the teeth 114 of the second gear 118, particularly with the arcuate first face 140, facilitates sufficient meshing of the gear set when in use.

In one embodiment, the location that the output gear 130 engages the second gear 118 in combination with the shape of the teeth 114 on the second gear 118, results in the pushing force or pressure angle 200 at the pitch point being substantially in the vertical direction (see e.g. FIG. 7), but may range up to 45° from the vertical. The shape of the teeth 114 on the second gear 118 are designed and dimensioned such that when the teeth 114 of the second gear 118 engage with the teeth 126 of the output gear 130 to transfer rotational power, the pushing force or pressure angle 200 at the pitch is substantially in the vertical direction (see e.g. FIG. 7). The pressure angle 200 at this interface will vary based on at what point the output gear 130 engages with the second gear 118, the shape of the teeth 114, and the circular pitch of the respective gears. With the modified teeth 114 according to the present invention, the pressure angle, i.e. the angle between the tooth face and gear wheel tangent, can range from 15 to 80 degrees.

There are various aspects that are used to configure the tooth shape of the second gear 118.

The pressure angle 200 can be controlled by varying the arcuate shape of the front face of the teeth 114. A weak arc, i.e. minimal curve, will give a small pressure angle 200, while a strong arc, i.e. a larger curve, will give a larger pressure angle 200. Or by using a portion of a circle shape as seen in FIG. 7, in which use of a small circle may create a greater pressure angle 200, and use of a larger circle may create less of a pressure angle 200.

In one embodiment, a larger pressure angle 200 is preferred for the embodiment illustrated in FIG. 7, but it may vary. A larger pressure angle 200 may result in a smaller output gear 130, while the second gear 118 remains the same diameter. This may allow the gearbox to be fabricated in different sizes, and may alter the energy transfer of the gearbox.

Common gears typically use a very small circular pitch distance compared to the present invention. By increasing the circular pitch and using less teeth, the present invention may provide the same gear ratio while one gear has a smaller diameter. Also, according to at least one embodiment of the present invention, the larger circular pitch allows for thicker and/or stronger teeth on both gears, which can equate to more torque/HP rating. Speed ratings are also comparable, although it is suggested that smaller pitch and pressure angles should be used where high speed applications are required due to increased noise and vibration will result. However, in industrial applications, noise and vibration are not as particularly important compared with size vs torque/hp ratings.

The common gear set have their module fixed to specific number of teeth vs gear diameter and typically equivalent circular pitch, and therefore do not offer this advantage of providing a variety of tooth thickness.

The difference in circular pitch between the meshing gears is related to the pressure angle aspect. If the operating angle, i.e. the location on the second gear 118 at which the output gear 130 engages the gear is closer to horizontal, the less difference in circular pitch is used and a smaller pressure angle 200 will materialize at the gear interface. This would lend to the modified tooth having a weak arc on the front face 140. The further away the operating angle is from the horizontal diameter of the second gear 118, the greater the pressure angle 200 and the greater the difference in circular pitch between the second gear 118 and the output gear 130. This would lend to a stronger, or more bowed, arcuate shape on the front face 140 of the teeth 114 of the second gear 118.

Figure 5:
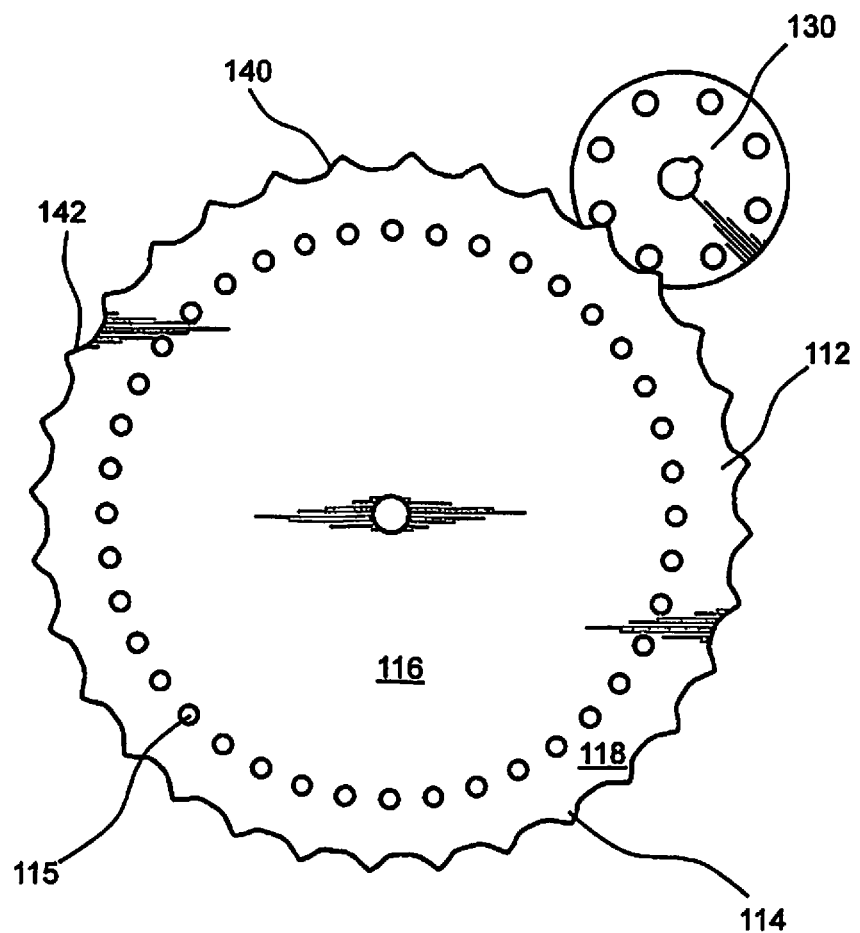
FIG. 5 is a front view of a gear set according to another embodiment of the present invention.
Figure 6:
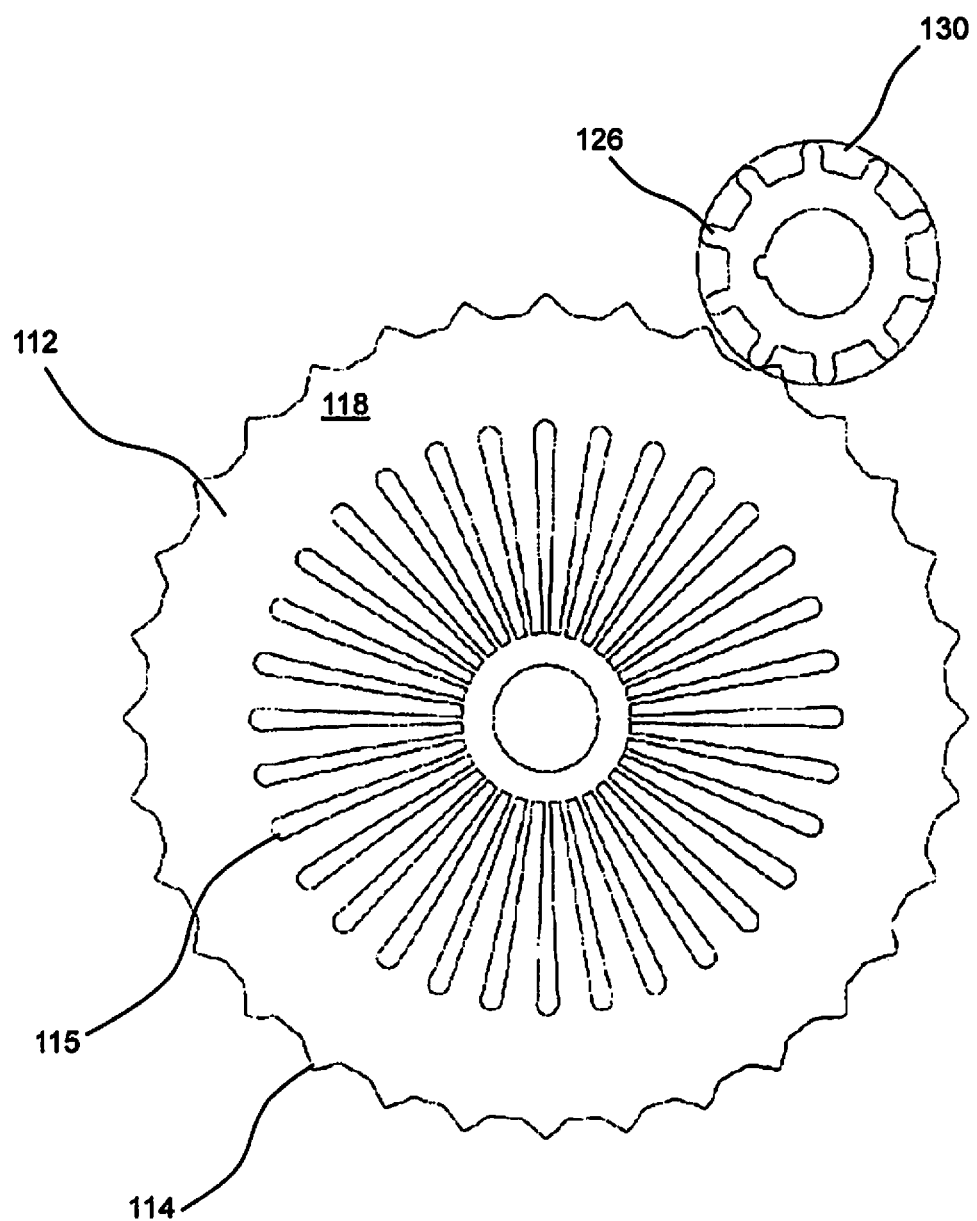
FIG. 6 is a front view of a gear set according to yet another embodiment of the present invention.

In the embodiment shown in FIGS. 5 and 7, the second gear 118 engage the output gear 130 at a position of from 1 to 85 degrees above the horizontal diameter of the wheel. It can be seen that the second gear 118 engage the output gear 130 in the upper right quadrant of the second gear 118. To configure the vertical/effective pitch of the second gear 118, the same method as explained above with respect to the embodiment shown in FIGS. 1 to 4 is used, i.e. matching the circular pitch of the output gear 130 with the vertical pitch of the second gear 118. To have proper meshing between the second gear 118 and the output gear 130, the output gear 130 needs to have the same vertical pitch as the second gear 118. In order to accomplish this, the meshing teeth 126 of the output gear 130 needs to be engaged in the lower left quadrant of the output gear (as seen in FIG. 7). The method used to calculate and configure the vertical pitch of the output gear 130 is the same as the method used on the second gear 118.

Note that the output gear 130 doesn't operate evenly above and below its horizontal diameter such as the input/output gear 22, 30 therefore the vertical pitch of the second gear 118 cannot be used as the value of the circular pitch of the output gear 130. Instead, the vertical pitch of the second gear 118 is determined in accordance with its engaging point with the output gear 130 (preferably around 53 degrees above the horizontal diameter of the second gear 118). The vertical pitch distance of the second gear 118 is then calculated.

Afterward, the output gear 130 is designed and fabricated with a specific circular pitch to match the calculated vertical pitch of the second gear 118. This provides for proper meshing of the second gear 118 and the output gear 130. This step also provide the operating angle that the output gear 130 will use.

In one embodiment, the tooth 114 shape is then designed to encourage proper meshing of the gears, while also taking into consideration the preferred characteristic of providing a pressure angle 200 that is substantially in the vertical direction (see FIG. 7) between the two meshing teeth 114 and 126.

In addition, in one embodiment, a bigger or smaller diameter output gear 130 can be easily used. If a bigger size output gear 130 is used (while maintaining the same number of teeth), the engagement with the second gear 118 will occur closer to the vertical diameter of the output gear 130 to maintain the required vertical pitch. If a smaller output gear 130 is used, then the engagement with the second gear 130 will occur closer to the horizontal diameter in order to maintain the required vertical pitch. Therefore many sizes of gears can be used with the same second gear 118. The shape of the teeth of the second gear 114 may need to vary depending on different output gear 130 sizes.

In the embodiments discussed above, different gear arrangement can also be used such as the upper left quadrant of the output gear 130 engaging with the lower right quadrant of the second gear 118; the lower right quadrant of the output gear 130 engaging with the upper left quadrant of the second gear 118; and the upper right quadrant of the output gear 130 engaging with the lower left quadrant of the second gear.

Concerning the illustrated embodiment, the rotation of the wheel 12 is primarily dependent upon the rotation of the input shaft 28. Accordingly, the wheel may rotate in either a clockwise or counter clockwise direction. However, from the perspective of observing the first gear 18, in an embodiment where the input gear 22 engages the teeth of the first gear 16 between about 1° to about 85° above the horizontal in the upper right quadrant of the first gear, and the output gear 30 engages the teeth of the second gear 18 between about 1° to about 85° above the horizontal in the upper left quadrant of the second gear, the mechanical gearbox 10 preferably rotates in a counter clockwise direction. Alternatively, from the perspective of observing the first gear 18, when the input gear 22 engages the teeth of the first gear 16 between about 1° to about 85° above the horizontal in the upper left quadrant of the first gear, and the output gear 30 engages the teeth of the second gear 18 between about 1° to about 85° above the horizontal in the upper right quadrant of the second gear, it is preferred that the wheel 12 rotate in a clockwise direction.

Figure 8:
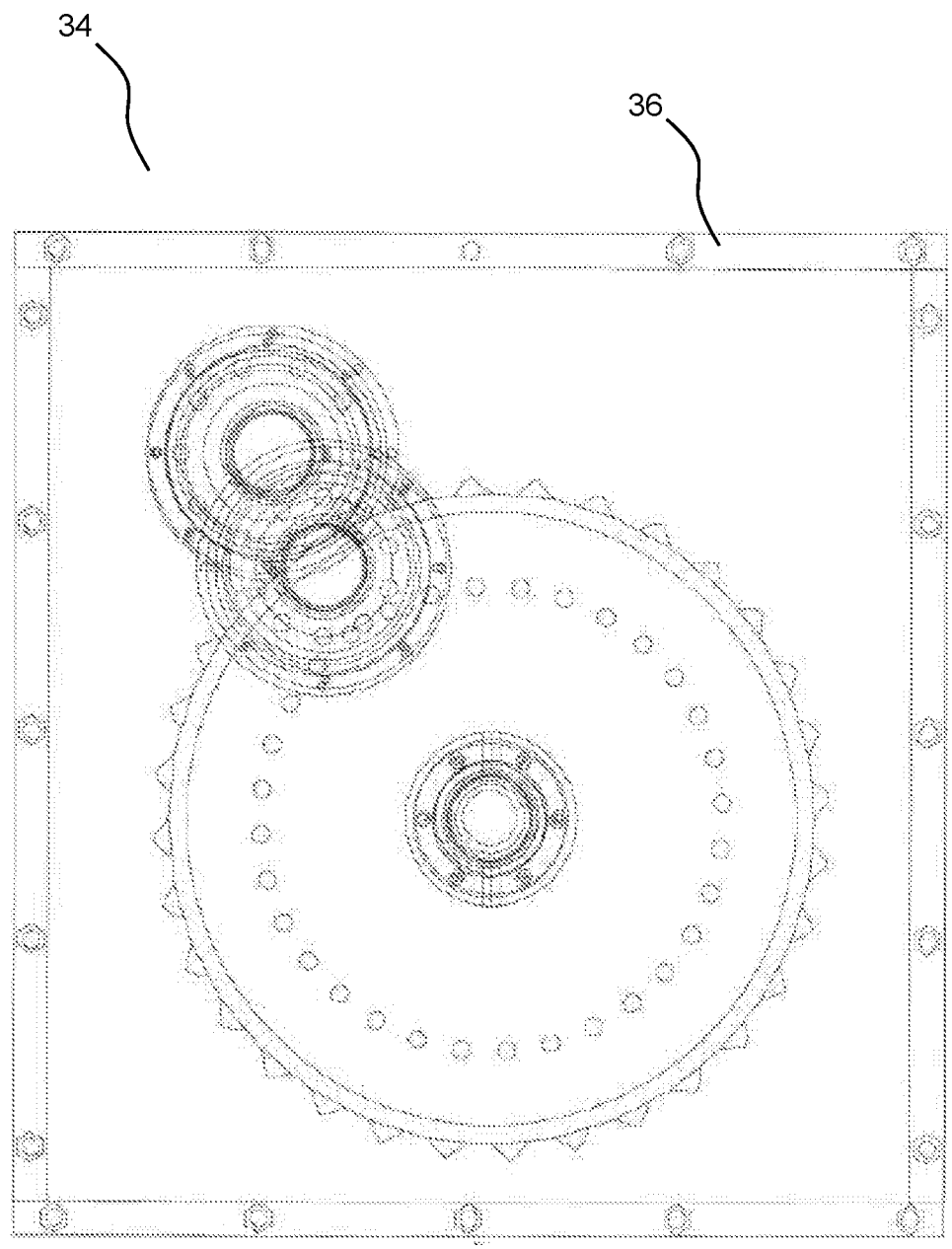
FIG. 8 is a front view of a gear set according to an embodiment of the present invention, in which the gear set is in a gear housing.
Figure 9:
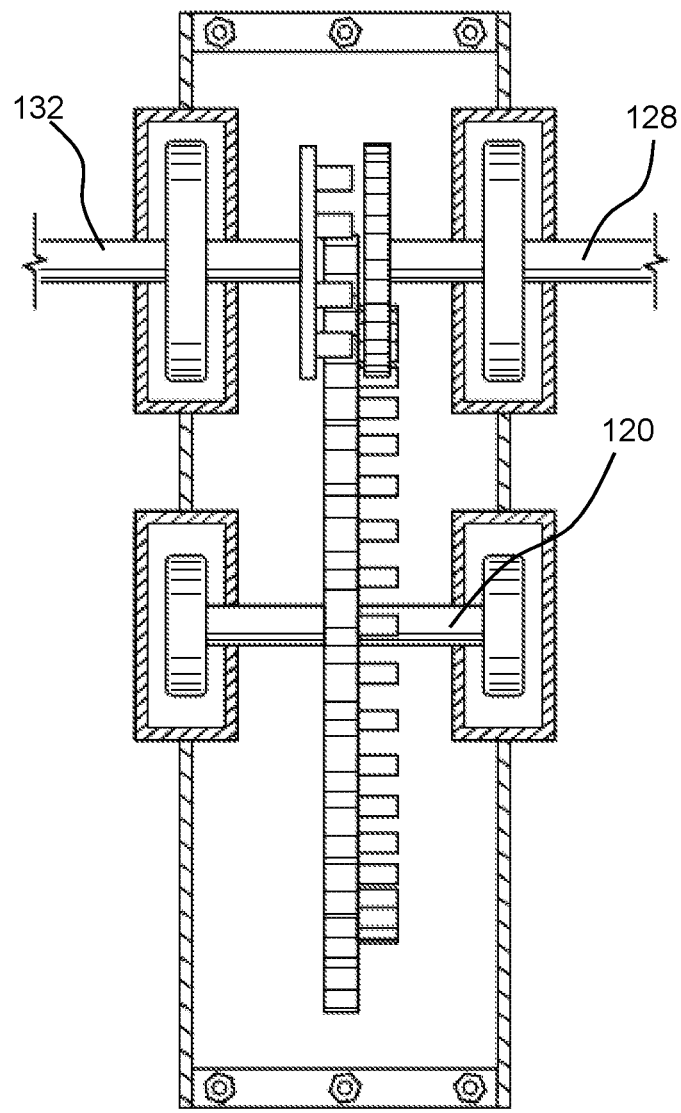
FIG. 9 is a top plan view of gear sets according to an embodiment of the present invention, in which the gear set is in a gear housing.

According to another embodiment the gear sets of the present invention may be incorporated into a mechanical gearbox 34 that is e.g. encased in a gear housing 36 (see e.g. FIG. 8 or 9). The gear housing 36 serves as a case to surround some or all of the components of the gearbox 34 to provide mechanical protection. Preferably, the gear housing encases substantially the wheel 112, the input gear 116 and the output gear 118, and may have e.g. sealed openings for the input shaft 128 and output shaft 132. In one embodiment, the axle 120 extends outwardly and attaches to the inside of the gear housing, thereby providing rotational support to the wheel 112. In another embodiment, the gear housing 36 is at least substantially fluid-tight, and is thereby able to hold lubricant, e.g. oil, which will bathe the gearbox 10. The excess lubricant will help to keep the mechanical parts clean of debris, and facilitate movement of the gears.

It is preferred that in all embodiments, the material of the gears, and particularly the teeth, is a hard unyielding material, such as steel.

The invention claimed is:

1. A mechanical gearbox, comprising:
a wheel oriented vertically;
a first set of teeth on a first face of the wheel defining a first gear;
a second set of teeth on a second face of the wheel defining a second gear;
an input gear operably engaged with the first set of teeth on the first gear;
an output gear operably engaged with the second set of teeth on the second gear;
wherein the input gear and the first gear have different circular pitches, and/or the second gear and the output gear have different circular pitches.

2. The mechanical gearbox according to claim 1, wherein the first set of teeth and the second set of teeth are rods that extend laterally outward from the wheel.

3. The mechanical gearbox according to claim 1, wherein the ratio of the circular pitch between the input gear and the first gear is from 1:1.05 to 1:1.3.

4. The mechanical gearbox according to claim 1, wherein the ratio of the circular pitch between the output gear and the second gear is from 1:1.05 to 1:1.3.

5. The mechanical gearbox according to claim 1, wherein the input gear and/or the output gear are cage gears.

6. The mechanical gearbox according to claim 5, wherein the diameter of the input gear is substantially vertical as the input gear engages with the first gear.

7. The mechanical gearbox according to claim 4, wherein the diameter of the output gear is substantially vertical as the output gear engages with the second gear.

8. The mechanical gearbox according to claim 6, wherein the input gear engages the first gear at a position of from 1° to 85° above the horizontal diameter of the wheel.

9. The mechanical gearbox according to claim 6, wherein the output gear engages the second gear at a position of from 1° to 85° above the horizontal diameter of the wheel.

10. The mechanical gearbox according to claim 1, wherein the first gear has a smaller diameter than the second gear.

11. A mechanical gearbox, comprising:
a wheel oriented vertically;
a first set of teeth on a first face of the wheel defining a first gear;
a second set of teeth extending radially from the wheel defining a second gear;
an input gear operably engaged with the first set of teeth on the first gear;
an output gear operably engaged with the second set of teeth on the second gear;
wherein the input gear and the first gear have different circular pitches, and/or the second gear and the output gear have different circular pitches;
wherein the second set of teeth of the second gear comprise an arcuate first face and a linear second face.

12. The mechanical gearbox according to claim 11, wherein the input gear and/or the output gear are cage gears.

13. The mechanical gearbox according to claim 11, wherein a pressure angle between the second set of teeth of the second gear and teeth of the output gear is from 15° to 80°.

14. The mechanical gearbox according to claim 11, wherein the direction of force applied at a pitch point between the second set of teeth of the second gear and teeth of the output gear is from 0° to 45° from vertical.

15. The mechanical gearbox according to claim 11, wherein the second gear engages the output gear at a position of from 1 to 85 degrees above the horizontal diameter of the wheel.

16. The mechanical gearbox according to claim 11, wherein the teeth of the output gear are engaged at a position of from 1 to 85 degrees below the horizontal diameter of the output gear.

17. The mechanical gearbox according to claim 11, wherein the upper right quadrant of the second gear engages with the lower left quadrant of the output gear.

18. The mechanical gearbox according to claim 11, wherein the lower right quadrant of the second gear engages with the upper left quadrant of the output gear.

19. The mechanical gearbox according to claim 11, wherein the upper left quadrant of the second gear engages with the lower right quadrant of the output gear.

20. The mechanical gearbox according to claim 11, wherein the lower left quadrant of the second gear engages with the upper right quadrant of the output gear.

\* \* \* \* \*